Oct. 22, 1940.  F. L. SMITH  2,219,201
REEL FOR HOSE, CABLES, ETC
Filed Feb. 21, 1939
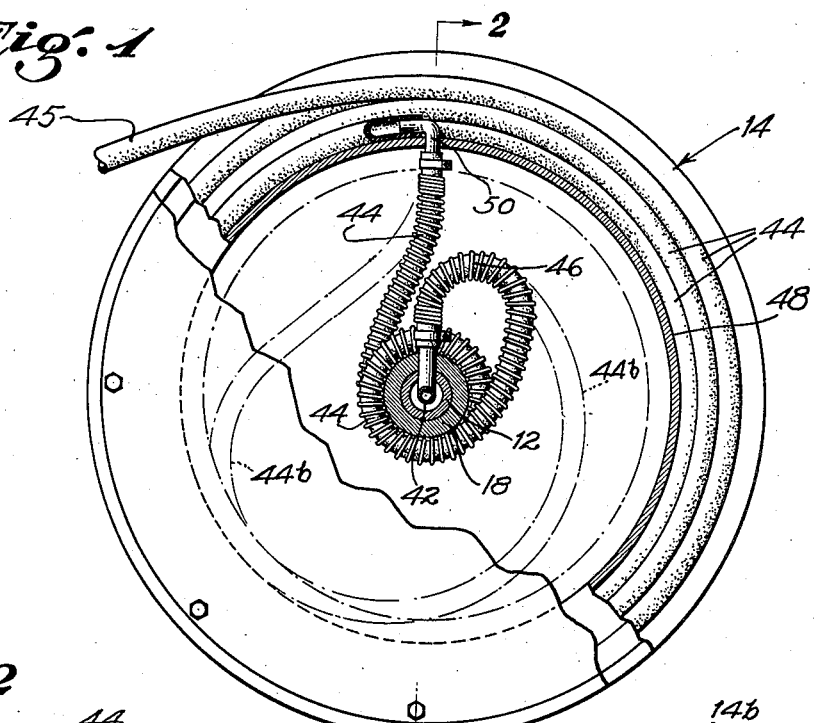
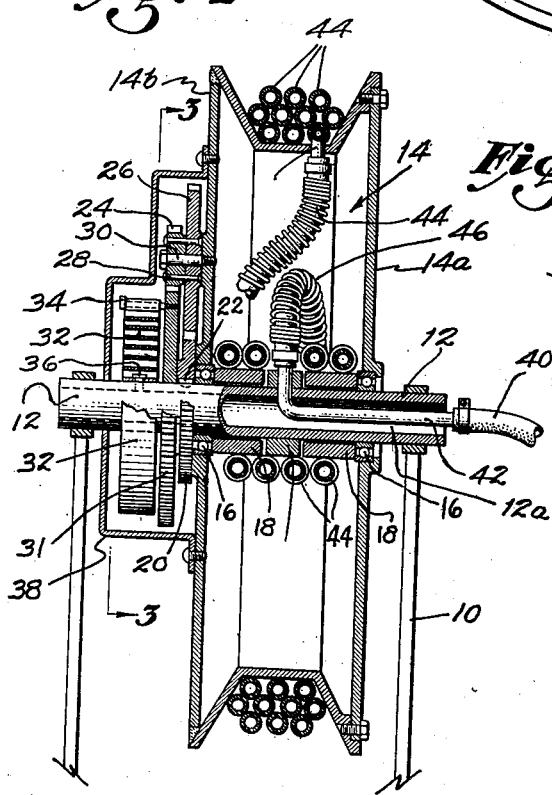
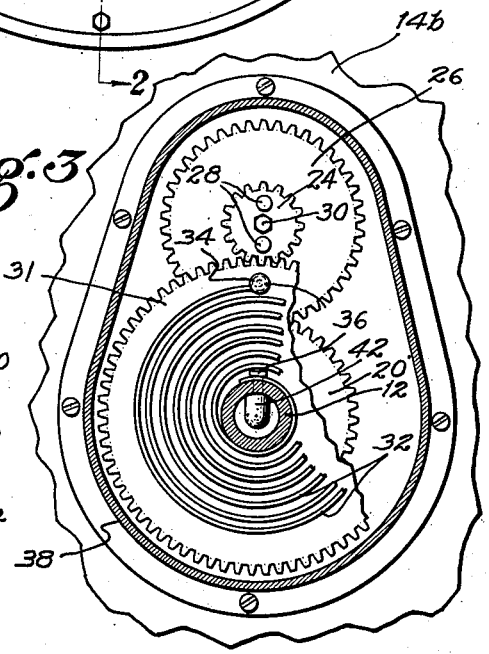
FRANK L. SMITH
INVENTOR Patented Oct. 22, 1940

2,219,201

UNITED STATES PATENT OFFICE 2,219,201

REEL FOR HOSE, CABLES, ETC.

Frank L. Smith, Los Angeles, Calif.

Application February 21, 1939, Serial No. 257,638

5 Claims. (Cl. 299—78)

The device of this invention relates to apparatus to facilitate paying out and reeling in hose of various types, electric power and telephonic lines or cables, etc., in such manner as to provide constant orderliness and convenience, as well as affording protection for the thing so reeled when not in use.

Many industries such as the aircraft, automotive, and automotive service stations constantly use air hose in particular of considerable lengths which is in intermittent service only, and when not in use ordinarily forms so much additional litter upon the floor or bench to the inconvenience and loss of efficiency of those who are engaged adjacent thereto.

In view of the above and of the record it may be said that a prime object of the invention is to provide an improved reel for hose, lines, etc., which is readily placed in use, a reel which is reliable and rugged in construction, and which in particular will not cause hose to crack and break under tension, torque, or flexion.

A further object of the invention is to provide a reel of such character as to place a minimum strain upon a fully payed out hose or cable and yet of sufficient counterbalance as to readily reel in such hose or cable without undue severity, being constant or practically so in reeling in the hose or cable previously payed out.

Other objects, features, and advantages of the invention may be noted from the accompanying drawing, the specification, and appended claims.

In the drawing of which there is one sheet:

Figure 1 is a side-elevation of the reel of this invention showing interior construction thereof.

Figure 2 is a sectional elevation taken substantially on line 2—2, in Figure 1 showing further disposition of cooperating elements in the reel of this invention.

Figure 3 is a vertical section through the gear covering as seen on line 3—3, in Figure 2, showing planetary gear arrangement as well as the spring used to drive the gears and drum for reeling in the hose thereon.

In the drawing the reference character 10 indicates a bracket or stand which is adapted to receive a non-rotatable hollow shaft 12 upon which is rotatably supported a drum 14 upon roller or other bearings 16. Anti-friction bearings or sleeves 18 encircle the shaft 12 between the inner walls 14a and 14b of the drum 14.

A non-rotatable gear 20 is secured adjacent the face 14b of the drum and is held in such position by means of a key 22 in splined relation between the shaft 12 and the gear 20. Planetary gears 24 and 26 are fixedly secured together by means of rivets 28 to move as a unit both with the reel 14 and rotatably upon the pin 30 threadedly secured to the side 14b in axial alignment with the medial transverse axis of the shaft 12. Of the gears 24 and 26, gear 26 is of the greater diameter and is meshed with the non-rotatable gear 20, while the smaller gear 24 is in mesh with the gear 31 which is rotatably positioned upon shaft 12.

A coil spring 32 is secured by means of a pin 34 in such manner as to move with the gear 31 to tightened or loose position, while the opposite end of the spring is fixedly secured to the shaft 12 by means of a suitable cap-screw 36, while a cover or guard 38 encloses the gear assembly and spring arrangement just described to protect the mechanism and avoid possible personal injury.

In the instant disclosure an air line 40, connected to a source of air compression not shown, conducts compressed air to an L shaped pipe 42, the greater leg of which lies within the central opening 12a of shaft 12, while the shorter leg of the pipe 42 is bent at right angles and passes through the walls of the shaft 12 positioned within a supporting bearing, see Fig. 2, and projects within the chamber defined by the inner peripheral walls of the reel 14 at which point it is fitted upon the end of an indeterminate length of hose 44 which after extending a short distance therefrom at right-angles, is bent laterally upon a suitable support such as the coiled steel wire 46, although any curved surface could be used for such support provided its radius was not too short. The hose is then given a plural number of turns around the sleeves 18 after which it extends outwardly to the peripheral wall 48 of the reel. At this point a metal fitting 50 joins the inner hose 44 with an indeterminate length of hose 44 upon the reel proper, being wound in such number of turns as to represent a desired lineal footage. Any suitable fitting, not shown in the drawing, may be secured upon the end of the hose for connection with tools or other appliances.

Operation of the hose reel of this invention may be described as follows. Upon assembly of the afore-mentioned mechanism in the manner stated, including placement of the hose 44 upon the pipe 42, and including a plural number of turns upon the sleeves 18, followed by leading the hose through the peripheral wall of the reel, and then by winding the required lineal footage of hose upon the reel, the apparatus is ready for use.

The free end 45 of the hose is pulled outwardly any desired length for use as may be desired. This action causes the reel 14 to rotate upon the bearings 16, and carries the assembly of gears 24 and 26 with rotation of the reel. Gear 20 which is stationary or in fixed relation to the shaft 12, forms a constant fulcrum for gear 26 thereby causing it to also rotate, and concurrently carrying gear 24 therewith, effects rotation of gear 31 which because of the connection at 34 with the spring 32 causes it to be wound more tightly upon the shaft 12 with which it is secured. Obviously upon release of the hose 44, the tension of the spring 32 will cause reverse rotation of gears 31, 24, and 26, and since the latter gear operates upon the fulcrum 20 (gear), the reel is rotated in such direction as to cause the hose 44 to be drawn inwardly up the reel.

During the interval of paying out hose it is to be noted unwinding hose off of the reel proper is simultaneously accompanied by unwinding hose that had been wound upon the sleeves 18, this action results in creating a pendently positioned loop of hose as shown in dotted lines at 44b.

It will be noted by reference to the drawing that the turns of air-hose, cable, or other thing wound upon the reel, bear a definite relation to the number of turns wound around the sleeves or in a broader sense, around the hub of the reel.

A predetermined number of turns around the hub will permit an unwinding of a given lineal footage from the reel, and it is to be noted that after extension of the lineal footage in ratio to the turns upon the hub, it is possible to extend an amount of hose which is double such lineal footage if the reel is provided with double footage in the ratio required, for continued extension will cause the previously unwound hose (on the hub) to again wind in a reverse direction, thereby taking up the sagged hose, etc., within the reel. An attempted extension of hose in excess of twice the ratio between the periphery of the reel and the hub will cause the hose to become taut and will hold against further rotation of the reel.

Obviously any reasonable footage of hose may be placed upon the reel, and if a proper ratio is established between such reel and the hub thereof it will be readily apparent that the apparatus is adapted to pay-out twice the lineal footage of hose upon the reel.

This feature is a decided advantage, and renders more economical construction per foot of required hose extension than has heretofore been the case with hose-reels with which applicant is conversant.

An over-riding ratchet not shown in the drawing, may be used in the conventional manner to afford intermediate stops to hold the reel after a sufficient length of hose has been unwound therefrom. Such device has not been shown for the reason that its use is old and well known.

Obviously since the shaft 12 is non-rotatable, the end nearest the source of compressed air could be directly fitted through proper reduction fittings with such source of compressed air, while the opposite end of the shaft 12 could be closed by use of a proper plug or cap fitting to prevent direct loss of air. In this case the present inner hose connection to the shorter leg of the L shaped pipe 42, would be represented by any suitably connected nipple to conduct air from the shaft 12 to the hose 44.

The sleeves 18 afford adjustable means to readily and easily effect proper alignment and nesting of the turns of hose wound thereupon, thereby eliminating any likelihood of snarled or tangled hose in this division of the reel.

From the preceding description of structure and operation of the reel of this invention it will be apparent that I have developed and constructed a practical, useful, and easily applied apparatus for the purpose of paying out or reeling in all types of hose, power, light, and telephonic lines, and other articles or things of kindred nature.

It is obvious that various changes and modifications and variations may be made in practicing the invention in departure from the particular showing of the drawing and description, which are merely illustrative of the instant and preferred form, without however, departing from the true spirit of the invention as defined by the scope of the appended claims.

I claim:

1. In an apparatus adapted to rotatably support a plural number of convolutions of hose, a stationary hollow shaft having a conduit positioned in the center thereof and extending laterally through a side thereof to receive an end of a flexible hose partially extending clockwise around said shaft, a revoluble reel mounted on said shaft, said reel being manually rotatable in one direction and being spring actuated for reverse rotation thereof and having counterclockwise turns of hose wound thereon, said last mentioned hose being in open communication with the hose on said shaft whereby hose on said shaft will concurrently unwind as said reel is turned to unwind hose therefrom, 2. In an apparatus adapted to rotatably support a plural number of convolutions of hose, a non-rotatable shaft, a revoluble reel mounted on said shaft, said reel being manually rotatable in one direction and being spring actuated for reverse rotation thereof, the convolutions of hose in said apparatus being divisional in group windings, certain of said windings being clockwise and certain other of said windings being counterclockwise so that one group winding of hose will pay out as the other of said group windings is unwound thereby permitting freedom of reel movement, both of said group hose windings being in unrestricted open communication for passage of air, and a conduit within said shaft and extending laterally therefrom to receive the free end of one of said group hose windings, the other of the ends of said conduit being adapted to receive air under pressure from a point exterior of said apparatus.

3. In an apparatus adapted to rotatably support a continuous length of hose, a non-rotatable shaft, a revoluble reel mounted on said shaft, said reel being manually rotated in one direction by tension on said hose and being spring actuated for reverse rotation thereof upon release of said hose, said apparatus being so formed as to admit said hose to enter one side thereof and to extend in clockwise convolutions around said shaft and then to the periphery of said reel and being laid in counterclockwise convolutions thereon whereby hose wound on said shaft will unwind and sag therefrom as said apparatus is turned to unwind hose from said reel.

4. In an apparatus adapted to rotatably support a plural number of convolutions of flexible conduit, a non-rotatable shaft, a revoluble reel mounted on said shaft, said reel being manually rotated in one direction by tension on said flexible conduit and being spring actuated for reverse rotation thereof upon release of said flexible conduit, said apparatus being formed with an opening in one side thereof to admit a conduit, said conduit being wrapped around said shaft in a plural number of clockwise directed convolutions and then extending through an aperture formed in the periphery of said reel and then being wrapped around the said reel in a plural number of counterclockwise directed convolutions whereby a continuous tube is afforded from a point exterior of the side of said apparatus to a point tangential to the periphery of the reel of said apparatus.

5. A hose reel comprising in combination, a revoluble reel having an apertured periphery upon which a flexible hose is adapted to be wound, a non-rotatable reel support formed within an elongated opening in its axial center and having a laterally directed duct connecting the elongated opening with the outer side of said reel support, and an indeterminate length of flexible hose, said hose extending from a point lateral of said reel through said elongated opening and said duct, thence in clockwise convolutions around said non-rotatable support, then laterally from the longitudinal axis of said support and through said apertured reel periphery and then in counterclockwise convolutions on the said reel, said first mentioned hose convolutions being adapted to unwind and sag from said support as said reel is being turned to permit paying out of hose positioned thereon, and means to effect rewinding of said hose upon release of holding tension on the payed out hose.

FRANK L. SMITH.